(12) United States Patent
Khitrov et al.

(10) Patent No.: US 11,023,709 B2
(45) Date of Patent: Jun. 1, 2021

(54) SYSTEM, METHOD AND APPARATUS FOR MULTI-MODAL BIOMETRIC AUTHENTICATION AND LIVENESS DETECTION

(71) Applicant: ID R&D, Inc., New York, NY (US)

(72) Inventors: Alexey Khitrov, New York, NY (US); Konstantin Simonchik, St. Petersburg (RU)

(73) Assignee: ID R&D, INC., New York, NY (US)

( * ) Notice: Subject to any disclaimer, the term of this patent is extended or adjusted under 35 U.S.C. 154(b) by 350 days.

(21) Appl. No.: 15/966,708

(22) Filed: Apr. 30, 2018

(65) Prior Publication Data

US 2019/0130168 A1    May 2, 2019

Related U.S. Application Data

(60) Provisional application No. 62/491,393, filed on Apr. 28, 2017.

(51) Int. Cl.
| | | |
|---|---|---|
| *G06K 9/00* | (2006.01) | |
| *G06F 3/0488* | (2013.01) | |
| *G06F 21/32* | (2013.01) | |
| *G06N 3/04* | (2006.01) | |
| *G06N 3/08* | (2006.01) | |

(52) U.S. Cl.
CPC ..... *G06K 9/00275* (2013.01); *G06F 3/04883* (2013.01); *G06F 21/32* (2013.01); *G06K 9/00288* (2013.01); *G06K 9/00906* (2013.01); *G06N 3/0454* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 2014/0333415 | A1* | 11/2014 | Kursun | G06Q 30/00 340/5.83 |
| 2014/0337930 | A1* | 11/2014 | Hoyos | H04L 63/10 726/4 |
| 2015/0169943 | A1* | 6/2015 | Khitrov | G06K 9/00288 382/116 |
| 2016/0110528 | A1* | 4/2016 | Gupta | G06F 21/31 726/19 |
| 2018/0039990 | A1* | 2/2018 | Lindemann | G06F 21/31 |
| 2019/0220583 | A1* | 7/2019 | Douglas | G06F 21/316 |

\* cited by examiner

*Primary Examiner* — Fayyaz Alam
(74) *Attorney, Agent, or Firm* — Schmeiser, Olsen & Watts LLP

(57) ABSTRACT

A system and method and apparatus collect behavioral biometric and facial recognition data for biometric analysis by asking a user to type text to an electronic device. Fusion of knowledge based authentication, behavioral biometrics and facial recognition provides strong authentication and liveness detection, while keeping user experience to simply typing.

21 Claims, 8 Drawing Sheets

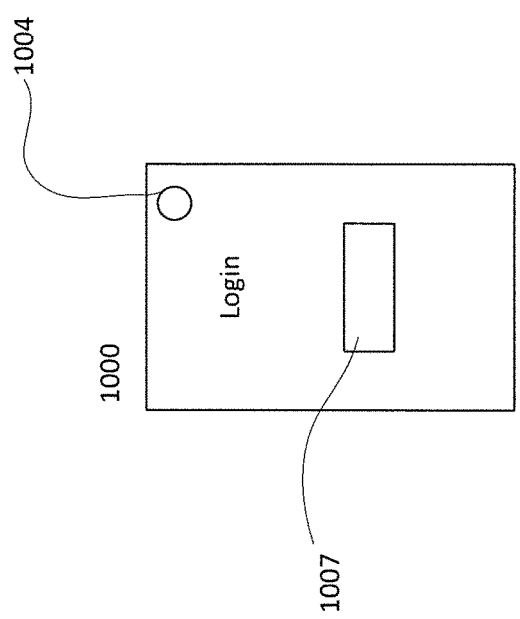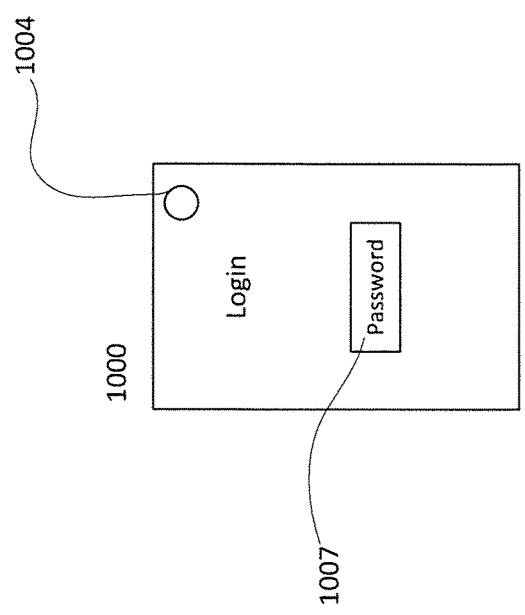
FIG. 8A
FIG. 8B

SYSTEM, METHOD AND APPARATUS FOR MULTI-MODAL BIOMETRIC AUTHENTICATION AND LIVENESS DETECTION

CROSS-REFERENCE TO RELATED APPLICATIONS

The present application relates to and takes priority from U.S. provisional application Ser. No. 62/491,393, filed on Apr. 28, 2017 and entitled "A SYSTEM, METHOD AND APPARATUS FOR MULTI-MODAL BIOMETRIC AUTHENTICATION AND LIVENESS DETECTION, which application is hereby incorporated by reference in its entirety.

BACKGROUND OF THE INVENTION

The present invention relates generally to a system, method and apparatus for an authentication system based upon behavioral biometric and facial recognition data.

The field of biometrics, or the measuring of a physical characteristic used to recognize the identity or verify the claimed identity of an individual, has emerged as an increasingly reliable methodology for verification (one-to-one) and identification (one-to-many) of individuals. Biometrics has become a very powerful tool in the solving of problems associated with requiring positive identification of individuals.

Additionally, the use and functionality of cell phones, mobile phones and other telecommunications devices has ramped up dramatically. Increasingly, the portability and widespread use of these devices makes biometric identification of a user of these devices desirable.

Recently, many studies on biometrics have been conducted. Biometrics is widely applied to biometric authentication systems using face or iris recognition, mobile phone security, mobile commerce, physical/logical access control, e-commerce, and the like. However, poor attention is paid to liveness detection.

Biometric authentication systems are vulnerable to forgery since fingerprints, irises, and faces can be easily forged. Hence, overcoming vulnerability to forgery is becoming an important issue for biometric system security. The kind of forgery described above is called 'spoofing,' which is carried out using a series of processes to intrude into a biometric authentication system using fake biometric samples.

Having a liveness detection apparatus resistant to spoofing is essential to tackle such spoofing. In particular, it is required to implement liveness detection technology using a non-intrusive method and without additional hardware.

SUMMARY OF THE INVENTION

In a first aspect, an embodiment of the present invention includes a user authentication system for electronic devices, where the electronic device includes a camera and a user interface and a CPU, where the CPU includes software programming to implement the authentication system comprising, prompting the user to type a text based login (or/and a password); simultaneously with the user typing the login, collecting a set of images of the user as the login is typed; and collecting behavioral biometric information about the user based upon the typed login; determining a facial recognition score based upon a comparison of the set of images of said user and a stored image of the user obtained during a prior enrollment session; determining a behavioral score upon a manner in which the user interacted with the device during the typing of the login; determining a biometric score based on facial score and behavioral score; determining the user's authentication score based upon the biometric score.

Some embodiment may include where the system determining a facial liveness score based on the analysis of the set of images of said user; determining a liveness score based on facial liveness score and behavioral score; determining the user's authentication score based upon the biometric score and the liveness score.

Some embodiments may include collecting behavioral biometric and facial recognition data for biometric analysis by asking a user to type text to an electronic device.

Some embodiments may include combining knowledge based authentication, behavioral biometrics and facial recognition in order to create strong authentication and liveness detection, while keeping user experience to simply typing.

Some embodiments may include system according to claim 1 where the user interface is either a touch screen, a keyboard or an audio input.

In a second aspect, an embodiment of the present invention includes a method to authenticate users for an electronic device, where the electronic device includes a camera, a user interface and a programmable database where the camera, user interface are interconnected and where the database includes software programming to implement the authentication, the method includes prompting the user to type a text based login into the user interface, simultaneously with the user typing the text based login, collecting at least one image of the user as the login is typed, and collecting multimodal behavioral information about the user based upon the typed login, determining a facial recognition score based upon a comparison of the at least one image and a stored image of the user obtained during a prior enrollment session, determining a facial liveness score based upon analysis of the at least one photo, determining a behavioral score based upon the multi modal behavioral information biometric score based on facial score and behavioral score, determining a biometric score based upon the facial recognition score and behavioral score and determining an authentication score of the user based upon the biometric score.

In some embodiments the invention includes determining a liveness score based on the facial liveness score and the behavioral score and determining an authentication score for the user based upon the biometric score and the liveness score.

In some embodiments the invention includes collecting behavioral biometric and facial recognition data for biometric analysis by prompting the user to type text into the electronic device.

In some embodiments the invention includes combining knowledge based authentication, behavioral biometrics and facial recognition simultaneously with the user typing on the electronic device.

In some embodiments the user interface comprises a touch screen, a keyboard or an audio input.

In some embodiments the invention includes selecting a preferred image from the at least one image collected and identifying at least one of image sharpness, facial rotation angles, or a distance between eyes measured in pixels.

In some embodiments the invention includes extracting a set of convolutional neural network (CNN) embeddings from a convolutional neural network module, where the CNN embeddings consists of combination of a convolutional layer, a max pooling layer, a relu layer and a fully connected layer.

In some embodiments the invention includes comparing the CNN embeddings with a facial template, calculating a facial score based upon a cosine of the CNN embeddings and facial template, collecting multimodal behavioral information step further comprises identifying at least one of keystroke dynamics data, accelerometer data or gyroscope data.

In some embodiments the invention includes determining a keystroke model and a combined accelerometer and gyroscope model and determining the behavioral score based upon the keystroke model and a combined accelerometer and gyroscope model.

In a third aspect, an embodiment of the present invention includes an apparatus for authenticating a user for an electronic device, where the electronic device includes a camera, a user interface and a programmable database where the camera, user interface are interconnected and where the apparatus includes a facial recognition module interconnected to the electronic device, where the facial recognition model is for receiving a set of images from the electronic device and determining a facial score, a behavioral recognition module interconnected to the electronic device, where the behavioral recognition model is for receiving behavioral data and determining a behavioral score, a biometrics module interconnected to the facial recognition module and the behavioral recognition module, where the biometrics modules for receiving the facial score and behavioral score and determining a biometric score, a facial liveness module interconnected with the electronic device, where the facial liveness module is for receiving the set of images and determining a facial liveness score, and decision module interconnected to the biometrics module, where the decision module is for receiving the biometric score and determining an authentication score.

In some embodiments the invention includes a facial capture module interconnected to the electronic device, where the facial capture model is for receiving a set of images from the electronic device and storing a facial template into a facial template database and a behavioral capture module interconnected to the electronic device, said behavioral capture model for receiving behavioral data and storing a behavioral template in a behavioral template database.

In some embodiments the invention includes a liveness module interconnected to the facial liveness module, the behavioral recognition module and the decision module, the liveness module for receiving the facial liveness score and the behavioral score and determining a liveness score.

In some embodiments the invention includes the decision module determines the authentication score based upon the biometric score and the liveness score.

In some embodiments the facial recognition module includes an image quality analysis module for receiving the at least one image and determining a preferred image, a convolutional neural network module interconnected to the image quality analysis module, the convolutional neural network module for receiving the preferred image and determining convolutional neural network embeddings, an embedding matching module interconnected to the convolutional neural network module, the embedding matching module for receiving the preferred image and the facial template and determining the facial score.

In some embodiments the behavioral recognition module includes a behavioral feature extraction module for receiving the behavioral data, a keystroke modeling module interconnected to the behavioral feature extraction module, the keystroke modeling module for receiving keystroke features and determining a keystroke model, an accelerometer and gyroscope modelling module interconnected to the behavioral feature extraction module, the accelerometer and gyroscope modelling module for receiving accelerometer and gyroscope modelling features and determining an accelerometer and gyroscope model, a behavioral matching module interconnected to keystroke modeling module and accelerometer and gyroscope modelling module, the behavioral matching module for receiving the keystroke model, the accelerometer and gyroscope model and the behavioral template and determining the behavioral score.

In some embodiments the facial capture module includes the image quality analysis module and the convolutional neural network modules, the facial capture module for receiving the set of images and determining a convolutional neural network embeddings to be stored in the facial template database.

In some embodiments the behavioral capture module includes the behavioral feature extraction module, the keystroke modeling module interconnected to the behavioral feature extraction module, the keystroke modeling module, the accelerometer and gyroscope modelling module and the behavioral matching module, where the behavioral capture module for receiving behavioral data and determining the behavioral template stored in the behavioral template database.

One of the goals of the invention is to authenticate users with high degree of accuracy and liveness detection with minimal interaction between a user and a device.

We can now collect biometric data for multi-modal authentication with a simple user experience of typing into an electronic device. The fusing of login, behavioral biometrics, facial recognition provides strong authentication and liveness detection, while user experience is kept at a minimum.

This invention allows to drastically simplify user experience of the biometric multi-modal authentication process, while strengthening security of the login process.

Previously the process of biometric login with liveness detection included active participation from a user (blinking, turning head, changing facial expression, speaking). This innovation simplifies this process, while providing strong fusion of knowledge based authentication and multi-modal biometric authentication.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

FIG. 8B shows an exemplary electronic device during implementation of the invention according to one embodiment of the present invention.

DETAILED DESCRIPTION OF THE PREFERRED EMBODIMENTS

The present disclosure will now be described more fully with reference the to the Figures in which an embodiment of the present disclosure is shown. The subject matter of this disclosure may, however, be embodied in many different forms and should not be construed as being limited to the embodiments set forth herein.

Figure 1:
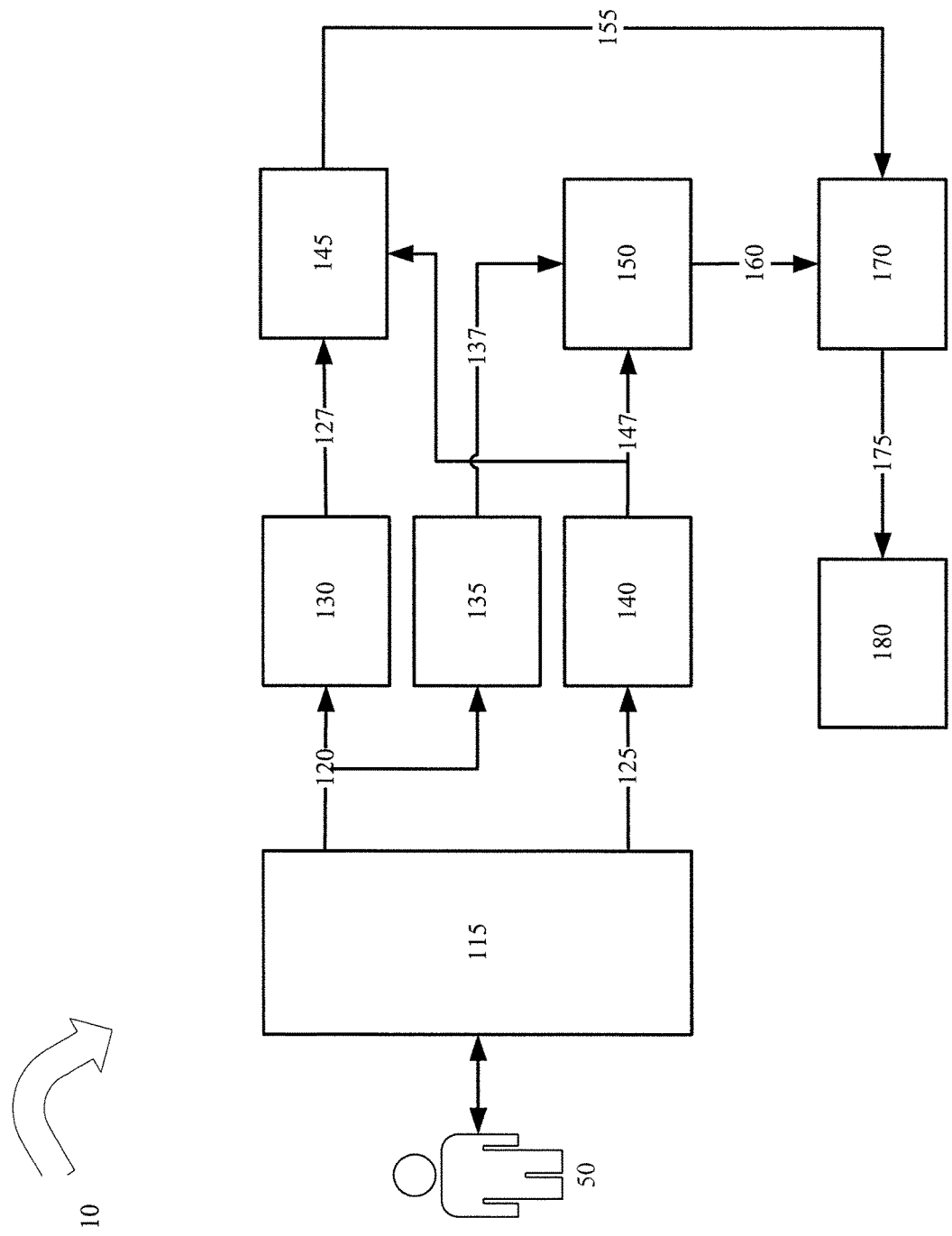
FIG. 1 shows a flow diagram of the system according to one embodiment on the authentication stage.

Referring to FIG. 1 there is shown a flow diagram showing system 10 according to one embodiment of the present invention during the authentication stage. A user 50 interacts with an electronic device 115 contains a login screen, with login text box where a user manually types into the login space his/her login information. Because a user needs to be facing the front of the mobile device or computer when entering login information, a device camera will naturally be facing the user. Without having to prompt the user to take a "selfie" the system with record a set of photos of the user while the user is typing the login information into the device.

While User enters a login (and/or the password) the system captures behavioral data 125 and images of a user's face 120, detects liveness (135) of the user and produces the Authentication Score 175. Behavioral information 125 can include biometrics such as keystroke dynamics, analysis of the data from an accelerometer, gyroscope, geo-location services, environment analysis including Bluetooth and WiFi networks information.

The set of photos taken of the user as the login (and/or the password) information is being entered are compared by a facial recognition module 130 to a photo previously stored in a database.

A facial liveness module 135 uses the same set of photos taken of the user 50 during the login (and/or the password) to determine whether it is a genuine User that interacts with electronic device 115 or a spoofing attack (e.g. video or photo with said User facial image were presented to the camera 1004 of the electronic device 115). The facial liveness module 135 produces a facial liveness score 137 as a measure of the user liveness probability. In some embodiments the electronic device includes a microphone and speakers, where by the device can capture audio. In some embodiments the device use sounds, flashes or other graphical signs to prompt the user to enter password information and/or look directly at the GUI of the device in order to ensure the user is facing the camera. In some embodiments the users voice can be captures by the microphone and stored as part of the behavioral information utilized by the system throughout.

Liveness module 150 determines the resulting liveness score 160 based on analysis of the facial liveness score 137 and behavioral score 147. Since behavioral data 125 is difficult to spoof, behavioral score 147 can be used as an additional metric for spoofing recognition. Liveness module 150 estimates the Liveness score $S_{liveness}$ (160) according the weighting of the facial liveness score $S_{facial-liveness}$ (137) and the Behavioral Score $S_{behavioral}$ (143:

$$S_{liveness} = w_1 S_{facial-liveness} + w_2 S_{behavioral},$$

where one of the embodiment of the invention operates with $w_1 = 0.8$ and $w_2 = 0.2$.

A biometric module 145 determines the resulting Biometric Score $S_{biometric}$ (155) based on the analysis of the Facial Score $S_{facial}$ (127) and the Behavioral Score $S_{behavioral}$ (137). One of the embodiment of the invention operates with linear weighting of the said scores:

$$S_{biometric} = \alpha_1 S_{facial} + \alpha_2 S_{behavioral},$$

where $\alpha_1 = 0.8$ and $\alpha_2 = 0.2$.

A decision module 170 determines the resulting authentication score 175 that determines access 180. Authentication score 175 considers the biometrics score 155 as well as liveness score analysis 160. The idea of the biometric and liveness combination is to protect system against both the unauthorized user asses and spoofing attacks.

The Authentication Score $S_{authentication}$ calculates as follows:

$$S_{authentication} = \begin{cases} S_{biometric} & \text{if } S_{liveness} > T_{liveness} \\ -10 & \text{if } S_{liveness} \leq T_{liveness} \end{cases},$$

where $T_{liveness}$ is a predefined threshold for Liveness Score. By default, $T_{liveness} = 0$.

Some embodiments of the present invention may calculate authentication score $S_{authentication}$ 175 based on Biometric Score only:

$$S_{authentication} = S_{biometric}$$

Figure 2:
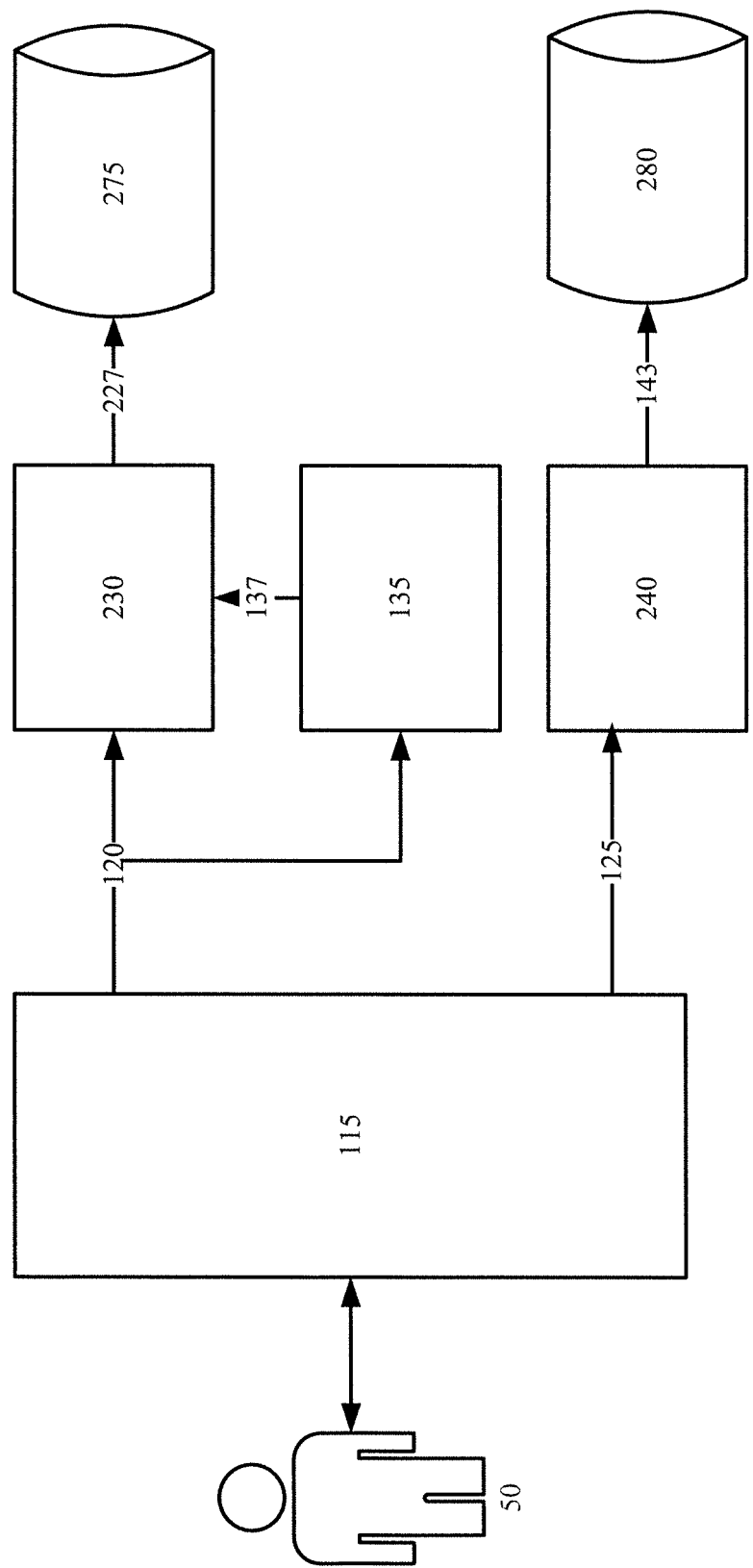
FIG. 2 shows a flow diagram of the system according to one embodiment on the enrollment stage.

Referring now to FIG. 2 there is shown a flow diagram of the disclosed system according to one embodiment of the present invention during an enrollment stage. The enrollment stage operates with the same type of data including facial and behavioral data as the authentication stage operates with. Electronic device 115 (as shown in FIG. 8) contains a login screen, with login text box where a user manually types into the login space his/her login information. A user is typically facing the front of the mobile device or computer when entering login information, a device camera will naturally be facing the user. Without having to prompt the user to take a "selfie" the system with record a set of photos of the user while the user is typing the login information into the device.

While User enters a login (and/or the password) the system employs a facial capture module 230 facial information 120 and stores it in a Facial Template Database 275. Preferably simultaneously the system employs behavioral capture module 240 to collect behavioral information 125 and store it in behavioral template database 280 correspondingly.

Some embodiments of the invention may use the facial liveness module 135 on the Enrollment stage with goal to reject enrollment if Facial Liveness Score $S_{facial-liveness}$ (137) detects a spoofing attack. The logic of the said operation looks as follows:

$$\begin{cases} S_{facial-liveness} > T_{facial-liveness} : & \text{Accept Enrollment} \\ S_{facial-liveness} \leq T_{facial-liveness} : & \text{Reject Enrollment} \end{cases},$$

where $T_{facial-liveness}$ is a predefined threshold. By default, $T_{facial-liveness} = 0$.

The details of some modules realizations are described herein.

Figure 3:
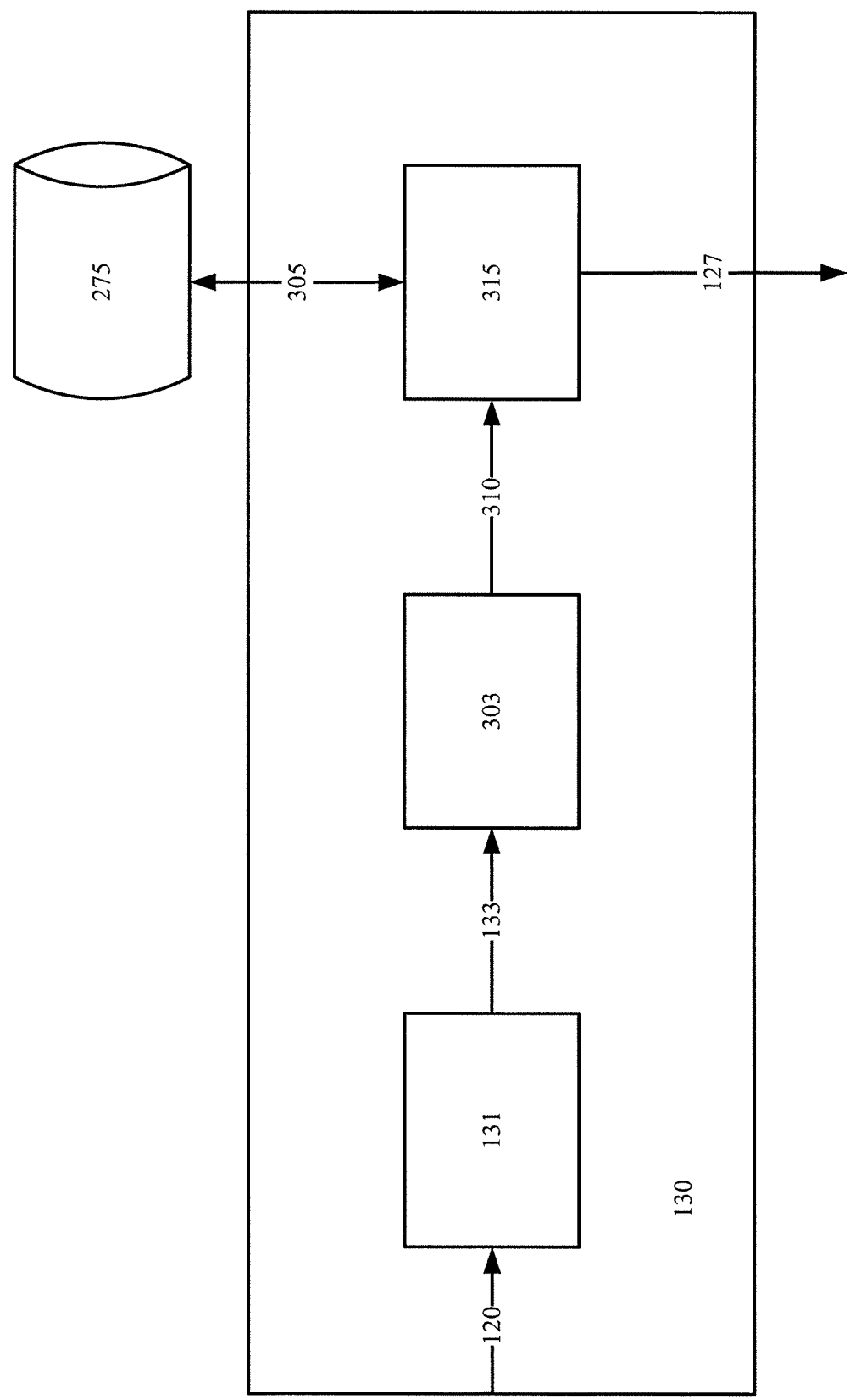
FIG. 3 shows a flow diagram of the facial recognition module 130 according to one embodiment on the authentication stage.

Referring now to FIG. 3 there is shown a flow diagram of the facial recognition module 130 according to one embodiment during the authentication stage.

The facial recognition module 130 analyses the quality of the facial information 120, which can be a set of images 121 using an image quality module 131. The system selects the best one (step 133), preferably stores it the facial template database 275 and uses said image to estimate a facial template. The image quality analysis module 131 considers includes the estimation at least of the following image parameters:
- image sharpness;
- facial rotation angles;
- the distance between eyes measures in pixels.

The image with the best overall quality uses in a pre-trained convolutional neural network (CNN) (303) with a goal to extract the outputs of a last CNN known as called CNN embeddings 310. One embodiment of the presented invention operates with a CNN 303 consisting of combinations of the following type of layers at least:
- convolutional layer;
- max pooling layer;
- relu layer;
- fully-connected layer.

An embedding matching module 315 compares CNN embeddings 310 with the facial template 305. One of the embodiment of the presented invention uses the cosine similarity for Facial Score $S_{facial}$ (127) calculation:

$$S_{facial} = \cos(y_{embeddings}, y_{template}),$$

where $y_{embeddings}$ is CNN embeddings vector, $y_{template}$ is Facial Template vector.

Figure 4:
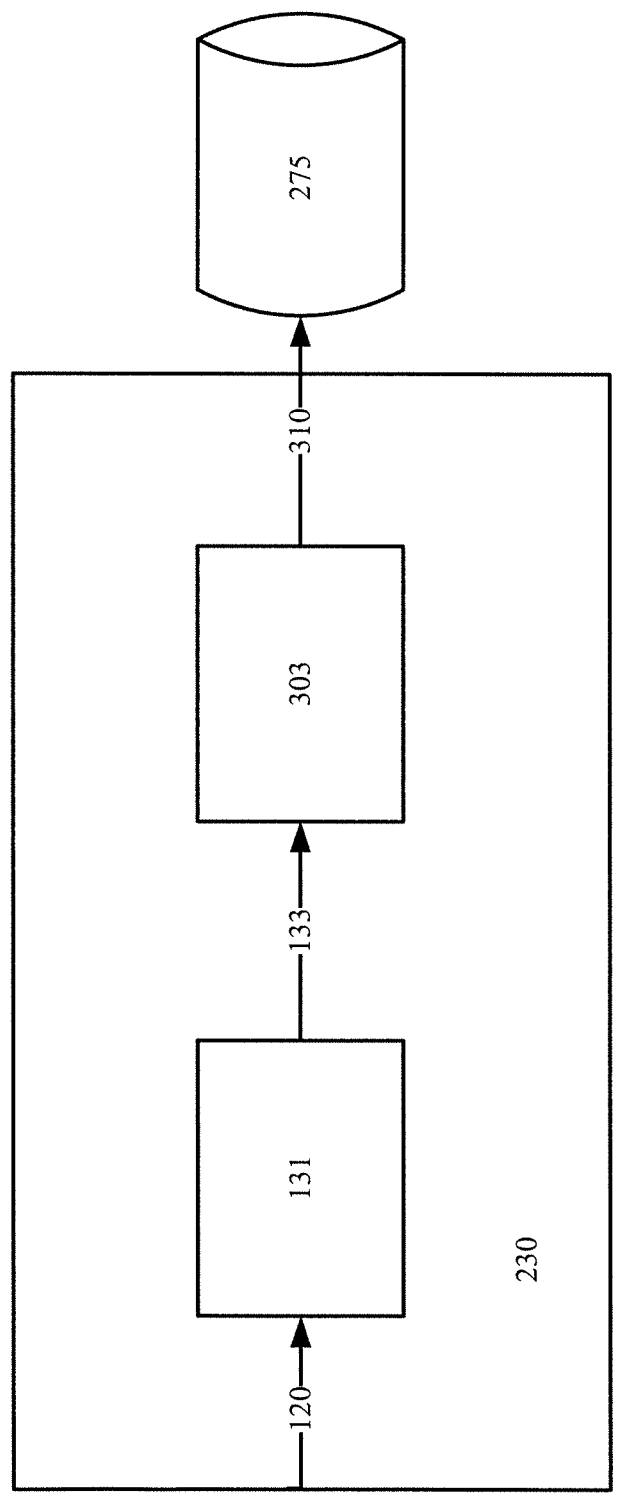
FIG. 4 shows a flow diagram of the facial capture module according to one embodiment on the enrollment stage.

Referring to FIG. 4 there is shown a flow diagram of the facial capture module 230 according to one embodiment during the enrollment stage.

The facial capture module 230 operates with the input set of images exactly with the same manner as facial recognition module 130 operates (see FIG. 3) except there is no matching of the CNN embeddings. The CNN embeddings are stored directly to the facial template database 275 and called then a 'Facial Template' 227.

Figure 5:
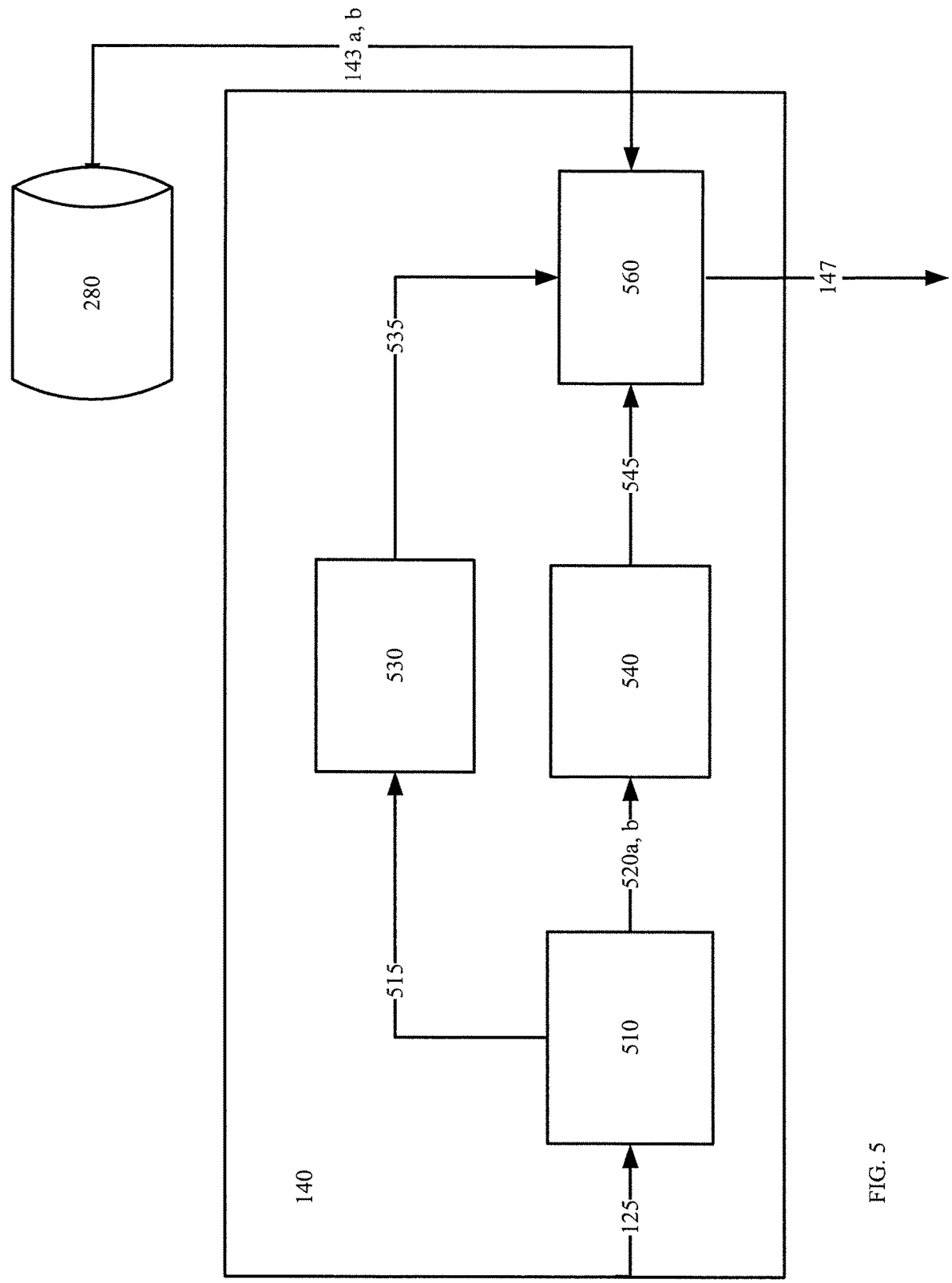
FIG. 5 shows a flow diagram of the behavioral recognition module according to one embodiment on the authentication stage.

Referring to FIG. 5 there is shown an embodiment of the present invention during the authentication stage. While User enters a login (and/or the password) a behavioral feature extraction module 510 captures behavioral information 125. One embodiment of the invention uses the following behavioral data:
- keystroke dynamics data
- accelerometer data
- gyroscope data Keystroke dynamics data 515 includes key press timings, key release timings captured for any key User presses while login (and/or password) entering. Accelerometer data 520a includes Ax, Ay and Az accelerometer values captured with sampling frequency 20-100 Hz as well as timing values when the accelerometer data points were captured. Gyroscope data 520b includes Gx, Gy and Gz gyroscope values captured with sampling frequency 20-100 Hz as well as timing values when the gyroscope data points were captured.

Keystroke modelling module 530 is a process of Keystroke Features Extraction—a set of vectors {PP}, {PR}, {RR}, where:

$$PP_i = T_i^{press} - T_{i-1}^{press},$$

$$PR_i = T_i^{press} - T_i^{release},$$

$$RR_i = T_i^{release} - T_{i-1}^{release},$$

where $T_i^{press}$—time point of the i-th key press, $T_i^{release}$—time point of the i-th key release.

Some embodiments of the invention may use additional keystroke features normalization technique with goal of the gaussinization of the feature distribution:

$$PP_i^{log} = \log(PP_i),$$

$$PR_i^{log} = \log(PR_i),$$

$$RR_i^{log} = \log(RR_i),$$

Accelerometer & gyroscope modelling module 540 includes a process of Accelerometer & Gyroscope Feature Extraction—a set of statistics $Ax_{mean}, Ay_{mean}, Az_{mean}, Ax_{std}, Ay_{std}, Az_{std}, Gx_{mean}, Gy_{mean}, Gz_{mean}, Gx_{std}, Gy_{std}, G_{std}$:

$$Ax_{mean} = \frac{1}{N}\sum_{i=1}^{N} Ax_i, \quad Ay_{mean} = \frac{1}{N}\sum_{i=1}^{N} Ay_i,$$

$$Az_{mean} = \frac{1}{N}\sum_{i=1}^{N} Az_i,$$

$$Ax_{std} = \sqrt{\frac{1}{N}\sum_{i=1}^{N}(Ax_i - Ax_{mean})^2},$$

$$Ay_{std} = \sqrt{\frac{1}{N}\sum_{i=1}^{N}(Ay_i - Ay_{mean})^2},$$

$$Az_{std} = \sqrt{\frac{1}{N}\sum_{i=1}^{N}(Az_i - Az_{mean})^2},$$

$$Gx_{mean} = \frac{1}{N}\sum_{i=1}^{N} Gx_i,$$

$$Gy_{mean} = \frac{1}{N}\sum_{i=1}^{N} Gy_i, \quad Gz_{mean} = \frac{1}{N}\sum_{i=1}^{N} Gz_i,$$

$$Gx_{std} = \sqrt{\frac{1}{N}\sum_{i=1}^{N}(Gx_i - Gx_{mean})^2},$$

$$Gy_{std} = \sqrt{\frac{1}{N}\sum_{i=1}^{N}(Gy_i - Gy_{mean})^2},$$

$$Gz_{std} = \sqrt{\frac{1}{N}\sum_{i=1}^{N}(Gz_i - Gz_{mean})^2}.$$

A behavioral matching module 560 compares a keystroke model 535 with keystroke features 143a extracted from the behavioral template database 280 and an accelerometer & gyroscope model 545 with the accelerometer & gyroscope features 143b also extracted from the behavioral template database 280.

The keystroke element of behavioral matching module 560 uses a modified L1 metrics and returns a Keystroke Score $S_{keystroke}$:

$$S_{keystroke} = \min_{k=1 \ldots N}\left(\frac{1}{M}\sum_{i} \frac{|F_{test_i} - F_{enroll_i}^{(k)}|}{Q_{enroll_i}}\right),$$

where N is a number of enrollment attempts stored in the keystroke template,
M is a number of feature points in the keystroke feature vector, F is a feature, can be {PP}, {PR} or {RR} defined above, Q is a normalization vector defined by several keystroke enrollments extracted from the keystroke template:

$$Q_{enroll_i} = \max_{i=1\ldots M}(F^{(1)}_{enroll_i}, F^{(2)}_{enroll_i}, \ldots F^{(N)}_{enroll_i}).$$

The accelerometer & gyroscope element of the behavioral matching module 560 uses a weighted L1 metrics and returns an Accelerometer & Gyroscope Score $S_{A\&G}$:

$$S_{A\&G} = \min_{k=1\ldots N} (\beta_1 |Ax_{mean_{test}} - Ax^{(k)}_{mean_{enroll}}| + \beta_2 |Ay_{mean_{test}} - Ay^{(k)}_{mean_{enroll}}| +$$
$$\beta_3 |Az_{mean_{test}} - Az^{(k)}_{mean_{enroll}}| + \beta_4 |Ax_{std_{test}} - Ax^{(k)}_{std_{enroll}}| +$$
$$\beta_5 |Ay_{std_{test}} - Ay^{(k)}_{std_{enroll}}| + \beta_6 |Az_{std_{test}} - Az^{(k)}_{std_{enroll}}| +$$
$$\beta_7 |Gx_{mean_{test}} - Gx^{(k)}_{mean_{enroll}}| + \beta_8 |Gy_{mean_{test}} - Gy^{(k)}_{mean_{enroll}}| +$$
$$\beta_9 |Gz_{mean_{test}} - Gz^{(k)}_{mean_{enroll}}| + \beta_{10} |Gx_{std_{test}} - Gx^{(k)}_{std_{enroll}}| +$$
$$\beta_{11} |Gy_{std_{test}} - Gy^{(k)}_{std_{enroll}}| + \beta_{12} |Gz_{std_{test}} - Gz^{(k)}_{std_{enroll}}|),$$

where $\beta_i$ is a i-th weight coefficient. Some embodiments of the invention operate with the following predefined $\beta_i$ values:

| Coefficient | Value |
| --- | --- |
| $\beta_1$ | 0.025 |
| $\beta_2$ | 0.025 |
| $\beta_3$ | 0.025 |
| $\beta_4$ | 0.11 |
| $\beta_5$ | 0.11 |
| $\beta_6$ | 0.11 |
| $\beta_7$ | 0.05 |
| $\beta_8$ | 0.05 |
| $\beta_9$ | 0.05 |
| $\beta_{10}$ | 0.15 |
| $\beta_{11}$ | 0.15 |
| $\beta_{12}$ | 0.15 |

The resulting behavioral score 147 is defined as a linear weighting of the said scores $S_{keystroke}$ and $S_{A\&G}$:

$$S_{behavioral} = \gamma_1 S_{keystroke} + \gamma_2 S_{A\&G},$$

where $\gamma_1 = 0.9$ and $\gamma_2 = 0.1$.

Figure 6:
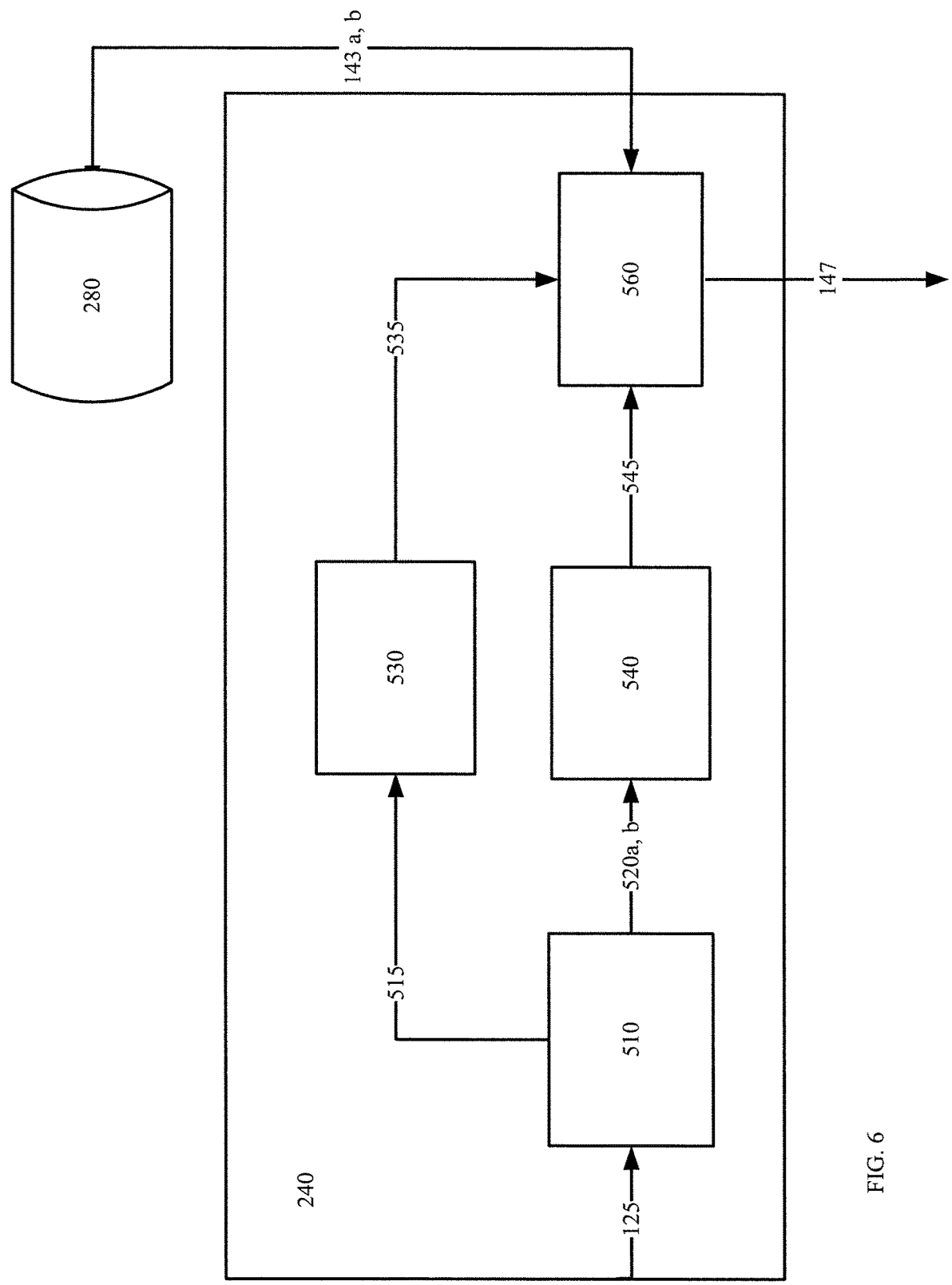
FIG. 6 shows a flow diagram of the behavioral capture module according to one embodiment on the enrollment stage.

Referring to FIG. 6 there is shown a flow diagram of the behavioral capture module 240 according to one embodiment during the enrollment stage.

The behavioral capture module 240 operates with the input behavioral data 125 exactly with the same manner as the behavioral recognition module 140 (see FIG. 5) operates except there is no matching of the behavioral features. The behavioral data 125 is stored directly to the behavioral template database 280 with a 'Behavioral Template' 143a, b. If there are multiple enrollment attempts all of them are stored in the same format in the behavioral template 143a, b linked to the corresponding User ID.

Figure 7:
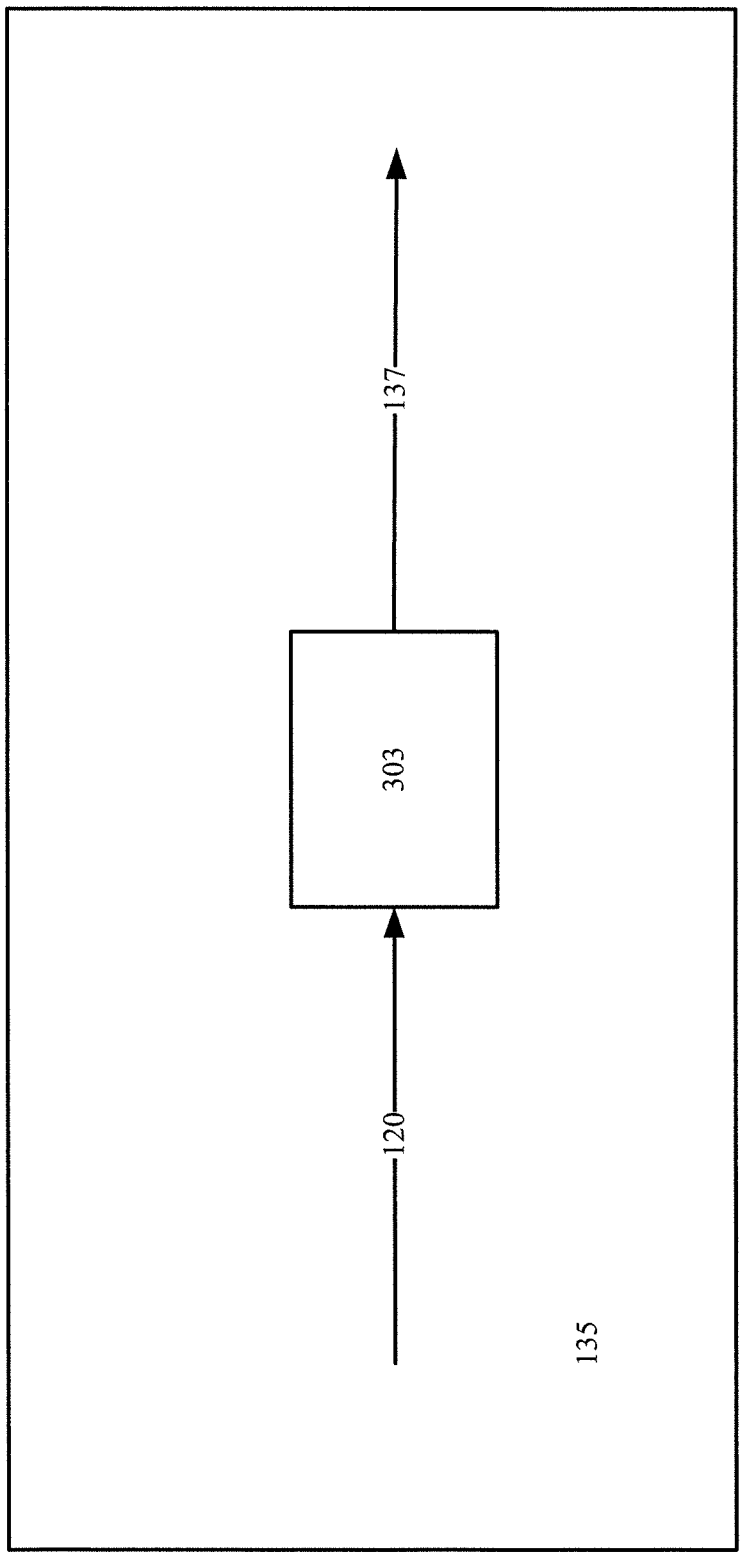
FIG. 7 shows a flow diagram of the facial liveness module according to one embodiment; and FIG. 8A

Referring to FIG. 7 there is shown a flow diagram of the facial liveness module 135 according to one embodiment of the present invention.

Facial liveness module 135 uses a set of images (120) as input, and transmits every image to the predefined Convolutional Neural Network (CNN) 303 trained to distinguish between original images and recorded one from the display or third-party photo presented to the camera. The output of the CNN is a single value for each image. The resulting Facial Liveness Score $S_{facial-liveness}$ is an average output of the CNN across all the images.

Referring now to FIGS. 8A and 8B there is shown an exemplary electronic device during the implementation of the invention. Log in screen 1000 includes login text box 1007 where a user manually types into the login space 1007 his/her login information. Because a user needs to be facing the front of the mobile device or computer when entering login information 1010 a device camera 1004 will naturally being facing the user. Without having to prompt the user to take a "selfie" the system with record a photo of the user while the user is typing the login information into the device (text box 1007).

Once the login information is entered into text box 1007 by user the system determines the behavioral information collected from the user during the login information being entered. Based upon the behavioral information the system determines a behavioral score. The photo taken of the user as the login information is being entered is compared to a photo previously stored in a database based upon a standard and customary enrollment procedure discussed herein. The present invention combines biometrics and knowledge based authentication.

It will be apparent to one of skill in the art that described herein is a novel system method and apparatus for multi-modal biometric authentication and liveness detection. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A method to authenticate users for an electronic device, where the electronic device includes a camera, a user interface and a programmable database where the camera, user interface are interconnected and where the database includes software programming to implement the authentication, the method comprising the steps of:

determining a facial liveness score based on an initial image of the user taken by the camera wherein the facial liveness score is a measure of user liveness probability based on a determination of whether the initial image is an original image of the user taken by the camera;

enrolling the user to be authenticated by the electronic device based on whether the facial liveness score is above a predetermined threshold;

prompting the user to type a text based login into the user interface;

simultaneously with the user typing the text based login:
collecting at least one image of the user as the login is typed; and
collecting multimodal behavioral information about the user based upon the typed login;

determining a facial recognition score based upon a comparison of the at least one image and a stored image of the user obtained during a prior enrollment session;

determining a behavioral score based upon multimodal behavioral information;

determining a biometric score based upon the facial recognition score and behavioral score; and determining an authentication score of the user based upon the biometric score, wherein the authentication score is based on the biometric score.

2. The method according to claim 1, further comprising the step of determining a liveness score based on the facial liveness score and the behavioral score and determining an authentication score for the user based upon the biometric score and the liveness score.

3. The method according to claim 1, further comprising the step of collecting behavioral biometric and facial recognition data for biometric analysis by prompting the user to type text into the electronic device.

4. The method according to claim 3, further comprising the step of further comprising the step of combining knowledge based authentication, behavioral biometrics and facial recognition simultaneously with the user typing on the electronic device.

5. The method according to claim 1, where the user interface comprises a touch screen, a keyboard or an audio input.

6. The method according to claim 1, where determining the facial recognition score step further comprises selecting a preferred image from the at least one image collected and identifying at least one of image sharpness, facial rotation angles, or a distance between eyes measured in pixels.

7. The method according to claim 6, further comprising the step of extracting a set of convolutional neural network (CNN) embeddings from a convolutional neural network module, where the CNN embeddings consists of a combination of at least two of the following elements:
 a convolutional layer, a max pooling layer, a relu layer and a fully connected layer.

8. The method according to claim 7, further comprising the step of comparing said CNN embeddings with a facial template.

9. The method according to claim 8, further comprising the step of calculating a facial score based upon a cosine of the CNN embeddings and facial template.

10. The method according to claim 1, wherein the collecting multimodal behavioral information step further comprises identifying at least one of keystroke dynamics data, accelerometer data or gyroscope data.

11. The method according to claim 10, further comprising the step of determining a keystroke model and a combined accelerometer and gyroscope model.

12. The method according to claim 11, further comprising determining the behavioral score based upon the keystroke model and a combined accelerometer and gyroscope model.

13. An apparatus for authenticating a user for an electronic device, where the electronic device includes a camera, a user interface and a programmable database where the camera, user interface are interconnected and where the apparatus comprises:
 a facial recognition module interconnected to the electronic device, said facial recognition module for receiving a set of images from the electronic device and determining a facial score;
 a behavioral recognition module interconnected to the electronic device, said behavioral recognition module for receiving behavioral data and determining a behavioral score;
 a biometrics module interconnected to the facial recognition module and the behavioral recognition module, the biometrics module for receiving the facial score and behavioral score and determining a biometric score based upon the facial score and behavioral score;
 a facial liveness module interconnected with the electronic device, the facial liveness module for receiving the set of images and determining a facial liveness score, wherein the facial liveness score is a measure of user liveness probability based on a determination of whether each image of the set of images was taken of the user by the electronic device, wherein the electronic device is configured to enroll a user to be authenticated by the electronic device based on whether the facial liveness score is above a predetermined threshold; and
 a decision module interconnected to the biometrics module, the decision module for receiving the biometric score and determining an authentication score based upon the biometric score.

14. The apparatus according to claim 13, further comprising:
 a facial capture module interconnected to the electronic device, said facial capture model for receiving a set of images from the electronic device and storing a facial template into a facial template database;
 a behavioral capture module interconnected to the electronic device, said behavioral capture model for receiving behavioral data and storing a behavioral template in a behavioral template database.

15. The apparatus according to claim 14, further comprising a liveness module interconnected to the facial liveness module, the behavioral recognition module and the decision module, the liveness module for receiving the facial liveness score and the behavioral score and determining a liveness score.

16. The apparatus according to claim 15, where the decision module determines the authentication score based upon the biometric score and the liveness score.

17. The apparatus according to claim 13, where the facial recognition module comprises:
 an image quality analysis module for receiving the at least one image and determining a preferred image;
 a convolutional neural network module interconnected to the image quality analysis module, the convolutional neural network module for receiving the preferred image and determining convolutional neural network embeddings;
 an embedding matching module interconnected to the convolutional neural network module, the embedding matching module for receiving the preferred image and the facial template and determining the facial score.

18. The apparatus according to claim 13, where the behavioral recognition module comprises:
 a behavioral feature extraction module for receiving the behavioral data;
 a keystroke modeling module interconnected to the behavioral feature extraction module, the keystroke modeling module for receiving keystroke features and determining a keystroke model;
 an accelerometer and gyroscope modelling module interconnected to the behavioral feature extraction module, the accelerometer and gyroscope modelling module for receiving accelerometer and gyroscope modelling features and determining an accelerometer and gyroscope model;
 a behavioral matching module interconnected to keystroke modeling module and accelerometer and gyroscope modelling module, the behavioral matching module for receiving the keystroke model, the accelerometer and gyroscope model and the behavioral template and determining the behavioral score.

19. The apparatus according to claim 14, where the facial capture module comprises the image quality analysis module and a convolutional neural network module, the facial capture module for receiving the set of images and determining a convolutional neural network embeddings to be stored in the facial template database.

20. The apparatus according to claim 14, where the behavioral capture module comprises the behavioral feature extraction module, the keystroke modeling module interconnected to the behavioral feature extraction module, the keystroke modeling module, the accelerometer and gyroscope modelling module and the behavioral matching module, where the behavioral capture module for receiving behavioral data and determining the behavioral template stored in the behavioral template database.

21. A method to authenticate users for an electronic device, where the electronic device includes a camera, a user interface and a programmable database where the camera, user interface are interconnected and where the database includes software programming to implement the authentication, the method comprising the steps of:

prompting the user to type a text based login into the user interface;

simultaneously with the user typing the text based login: collecting at least one image of the user as the login is typed; and collecting multimodal behavioral information about the user based upon the typed login;

determining a facial recognition score based upon a comparison of the at least one image and a stored image of the user obtained during a prior enrollment session;

determining a behavioral score based upon multimodal behavioral information;

determining a liveness score based on a facial liveness score and a behavioral score, wherein the facial liveness score is a measure of user liveness probability based on a determination of whether the at least one image is an original image of the user taken during login;

determining a biometric score based upon the facial recognition score and behavioral score; and determining an authentication score of the user based upon the biometric score, wherein the authentication score is based on the biometric score and liveness score.

* * * * *